(12) United States Patent
Cahill

(10) Patent No.: US 9,280,858 B2
(45) Date of Patent: Mar. 8, 2016

(54) SYSTEMS AND METHODS FOR BUILT IN TEST EQUIPMENT FOR A BRAKE CONTROL SYSTEM

(71) Applicant: GOODRICH CORPORATION, Charlotte, NC (US)

(72) Inventor: Eric Daniel Cahill, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 53 days.

(21) Appl. No.: 14/189,658

(22) Filed: Feb. 25, 2014

(65) Prior Publication Data

US 2015/0243113 A1    Aug. 27, 2015

(51) Int. Cl.
| | |
|---|---|
| *G07C 5/08* | (2006.01) |
| *B60T 17/22* | (2006.01) |
| *B64F 5/00* | (2006.01) |
| *B64C 25/44* | (2006.01) |
| *G01L 5/28* | (2006.01) |

(52) U.S. Cl.
CPC ............. *G07C 5/0808* (2013.01); *B60T 17/221* (2013.01); *B64C 25/44* (2013.01); *B64F 5/0045* (2013.01); *G01L 5/28* (2013.01)

(58) Field of Classification Search
None
See application file for complete search history.

(56) References Cited

U.S. PATENT DOCUMENTS

| | | | | |
|---|---|---|---|---|
| 5,023,791 A * | 6/1991 | Herzberg | ........... | G05B 23/0283 324/73.1 |
| 6,296,325 B1 * | 10/2001 | Corio | ................... | B60T 8/1703 244/110 A |
| 6,402,259 B2 * | 6/2002 | Corio | ................... | B60T 8/1703 244/111 |
| 8,463,462 B2 * | 6/2013 | Cahill | ................... | B60T 17/221 187/248 |
| 8,683,857 B2 * | 4/2014 | Cahill | ................... | B60T 17/221 73/121 |
| 8,712,626 B2 * | 4/2014 | Cahill | ................... | B60T 8/1703 701/29.1 |
| 2010/0057320 A1 * | 3/2010 | Whittingham | ........ | B60T 8/1703 701/70 |
| 2010/0286880 A1 * | 11/2010 | Cahill | ................... | B60T 8/1703 701/70 |
| 2010/0292889 A1 * | 11/2010 | Cahill | ................... | B60T 8/1703 701/29.1 |
| 2011/0214496 A1 * | 9/2011 | Cahill | ................... | B60T 17/221 73/121 |
| 2011/0219863 A1 * | 9/2011 | Whatley | ................. | B60T 8/885 73/121 |
| 2013/0062935 A1 * | 3/2013 | Cahill | ................... | B64C 25/426 303/20 |
| 2013/0145833 A1 | 6/2013 | Cahill | | |
| 2013/0282251 A1 * | 10/2013 | Cahill | ..................... | B60T 8/00 701/70 |

FOREIGN PATENT DOCUMENTS

| | | |
|---|---|---|
| EP | 2565093 | 3/2013 |
| FR | 2990192 | 11/2013 |

OTHER PUBLICATIONS

Extended European Search Report dated Jul. 24, 2015 in European Application No. 15156051.3.

* cited by examiner

*Primary Examiner* — Jason Holloway
(74) *Attorney, Agent, or Firm* — Snell & Wilmer, LLP

(57) ABSTRACT

A method is disclosed that comprises severing an I/O channel between an EMAC and an aircraft component; sending a test signal to the brake system controller; receiving, from the brake system controller, a feedback signal to the test signal; and determining an appropriateness of the feedback signal.

6 Claims, 8 Drawing Sheets

US 9,280,858 B2

SYSTEMS AND METHODS FOR BUILT IN TEST EQUIPMENT FOR A BRAKE CONTROL SYSTEM

TECHNICAL FIELD

The present invention relates to systems and methods for testing brake control systems.

BACKGROUND

Modern aircraft braking systems often provide greater control, reliability and flexibility than systems of previous generations. However, to ensure optimum operation, the various components of modern braking systems should undergo regular testing. In this regard, regular testing may detect the need to replace wear items, identify components with the potential for malfunction, and identify potential areas for recalibration.

Conventional testing of an aircraft brake system involves taking the aircraft out of service and either physically inspecting components and/or using the brake system while the aircraft remains grounded and parked. Such methods necessitate the loss of use of the aircraft during testing, while involving the labor and cost of technicians that detect potential issues.

Accordingly, there exists a need for testing systems and methods that allow for real time brake system testing.

SUMMARY

In various embodiments, a method is provided establishing a safety interlock between an electromechanical actuator controller ("EMAC") and an aircraft component, severing an in/out ("I/O") channel between the EMAC and the aircraft component, sending a test signal to the EMAC, receiving from the EMAC a feedback signal to the test signal, and determining an appropriateness of the feedback signal.

In various embodiments, a method is provided comprising disposing a selectively severable I/O channel between an electromechanical actuator controller ("EMAC") and an aircraft component, coupling the EMAC with a built in test equipment ("BITE") region, wherein the BITE region comprises a testing module capable of sending a test signal to the EMAC, and establishing a safety interlock region by disposing a non-severable I/O channel between the EMAC and the aircraft component.

DETAILED DESCRIPTION

Figure 1:
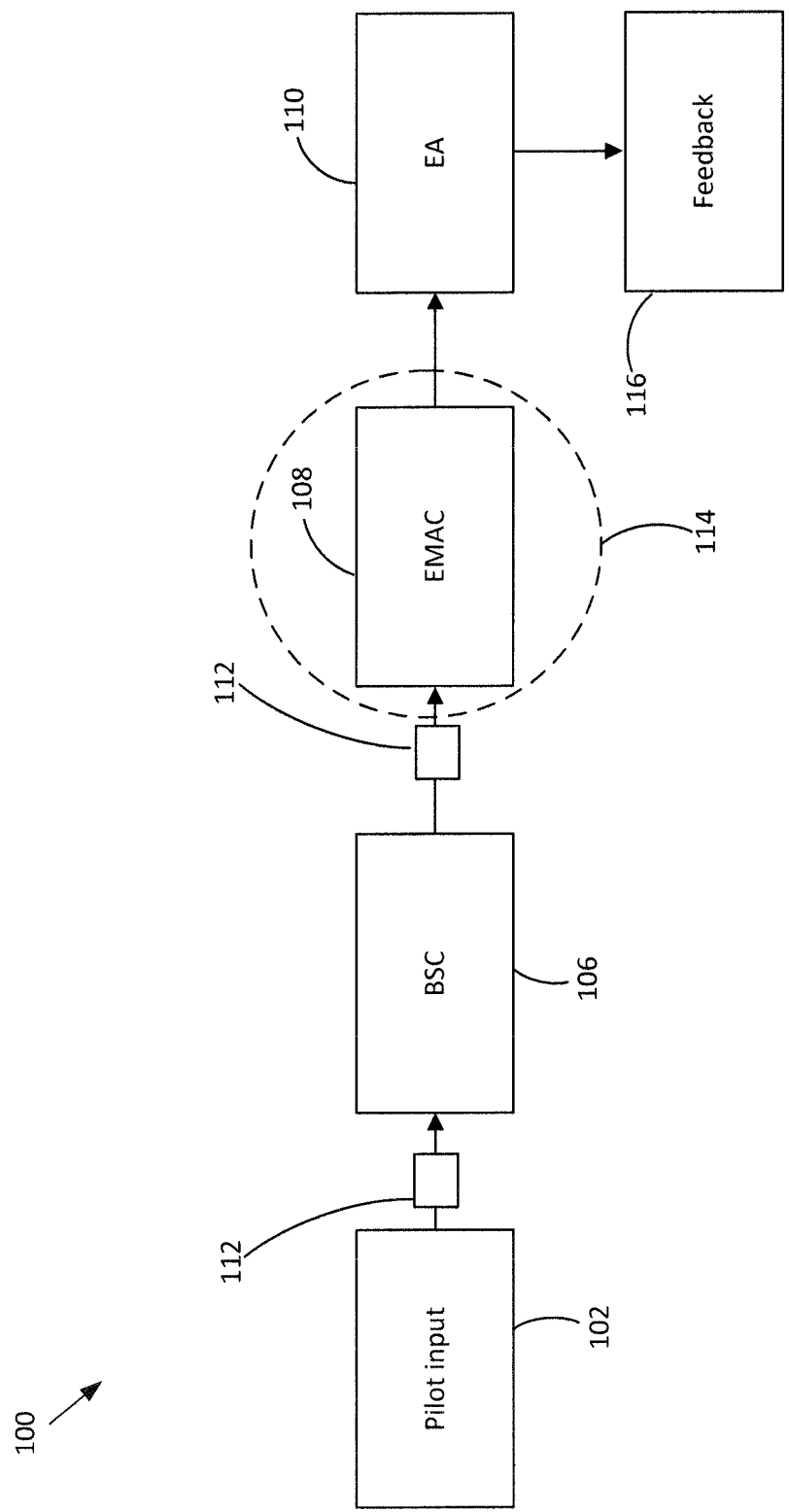
FIG. 1 illustrates a brake control system and a BITE region in accordance with various embodiments.

The detailed description of exemplary embodiments herein makes reference to the accompanying drawings, which show exemplary embodiments by way of illustration and its best mode. While these exemplary embodiments are described in sufficient detail to enable those skilled in the art to practice the invention, it should be understood that other embodiments may be realized and that logical, electrical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are disclosed herein that provide for testing a brake control system. In accordance with various embodiments, by testing a brake control system, the brake control system may be calibrated appropriately and/or potential areas of concern may be revealed. The systems and methods disclosed herein are suitable for use with various aircraft braking systems, although there may be utility for use with other braking systems.

During conventional testing of an aircraft brake system, an aircraft is typically taken out of service and either physically inspected or the brake control system is tested while the aircraft remains grounded and parked. However, as noted above, such methods necessitate the loss of use of the aircraft during testing, while involving the labor and cost associated with technicians to detect potential issues.

However, as it has been presently found by the present inventor, a brake control system may be wrapped in (or encompassed by) a BITE system for in-use testing of the brake control system. In various embodiments, the BITE system may control I/O channels to various components of the brake control system and may sever/reestablish those channels so that testing may occur in real time, and often, without the need (or minimal need) to take an aircraft out of service. Accordingly, by using a BITE system, an aircraft brake control system may be appropriately maintained without excess down time.

Moreover, in accordance with various embodiments, it has been found that in electric brake systems, the BITE system may include a safety interlock surrounding an electromechanical actuator controller ("EMAC"). In that regard, the BITE system may test various brake functions without the need to burden a BSC with handling built in testing, which tends to reduce processor load on the BSC, among other benefits. In various embodiments, the BITE system retains emergency braking functionality and may interrupt or terminate built in testing procedures in response to a command from an emergency braking system.

Systems and methods disclosed herein may be useful for brake disk stacks for use in aircraft. Aircraft may comprise one or more types of aircraft wheel and brake assemblies. For example, an aircraft wheel and brake assembly may comprise a non-rotatable wheel support, a wheel mounted to the wheel support for rotation, and a brake disk stack (also referred to as a brake assembly). An aircraft brake disk stack generally comprises a friction brake mechanism including a pressure plate that is adjacent to a means, device or other mechanism for exerting force such as a hydraulic piston motor or one or more electromechanical actuators. Force may be exerted through, for example, one or more rams. As referred to herein, "electric brake systems" employ one or more electromechanical actuators to drive the one or more rams.

An aircraft brake typically further comprises an end plate distal from the means for exerting force and a plurality of interleaved rotor disks and stator disks which together form the brake heat sink. Each rotor disk may be coupled to the wheel for rotation therewith and each stator disk is coupled to the wheel support against rotation. The friction brake mechanism also generally includes a torque tube and a back leg on which a pressure plate, end plate and stator disks are slidably mounted against rotation relative to the wheel and rotor disks. The stator disks may comprise two wear faces and the pressure plate may comprise a single wear face. The rotors disks and stator disks may be formed of a friction material, such a carbon/carbon or a carbon metallic matrix material. A brake head may house the piston motor or one or more rams that extend to move the pressure plate and axially compress the brake disk stack against the end plate.

The actuator rams may be electrically operated actuator rams or hydraulically operated actuator rams, although some brakes may use pneumatically operated actuator rams. In electric brake systems, a BSC is coupled to one or more EMACs for a brake, which drives one or more electromechanical brake actuators. The BSC may be in communication with a brake pedal, and thus may control the EMACs in accordance with pilot/copilot braking commands.

With reference to FIG. 1, aircraft braking control system 100 includes at least one BSC 106, and frequently, at least two brake system controllers may be used for redundancy purposes. BSC 106 may contain various information pertaining to an aircraft, such as weight, make, model, and aircraft brake system configuration to assist in making this determination. BSC 106 is in communication with various components that relay pilot input 102 to BSC 106. For example, pilot input 102 may comprise a signal produced by one or more aircraft brake indicators. In addition to pilot input 102, input from other aircraft systems (not shown) may be relayed to BSC 106.

In this regard, an aircraft brake indicator may be any device that allows a pilot to input braking commands. For example, an aircraft brake indicator may be one or more aircraft brake pedals.

BSC 106 may provide an input/output interface ("I/O interface") to other components of an aircraft braking system. An I/O interface may comprise one or more I/O channels. For example, BSC 106 may be in communication (e.g., electrical communication) with components in a cockpit of the aircraft (e.g., an aircraft brake pedal) and/or other portions of an aircraft braking system (e.g., electromechanical actuator controller 108). Such communication may be provided by, for example, the I/O interface (implemented using, for example, a bus or a network). Signals from a brake pedal (e.g., in response to pilot input 102) may be received by the BSC 106 via one or more I/O channels. An I/O channel may be any means of electrical communication. For example, an I/O channel may comprise a wire connection or a wireless connection (e.g., via an RF transceiver). An I/O channel may be severed transiently by interrupting an electrical connection, for example, by canceling the interruption. Accordingly, the severing of an I/O channel may be a reversible process. One or more I/O channels of an I/O interface may be reversibly severed at a given time.

In addition, BSC 106 may contain a computing device (e.g., a processor) and an associated memory. The associated memory may contain executable code for performing braking control. The associated memory may comprise an article of manufacture including a computer-readable medium having instructions stored thereon that, if executed by a computing device (e.g., a processor), cause the computing device to perform various methods.

As noted above, in an embodiment and with reference to FIG. 1, a BSC may be in communication with one or more EMACs. For example, BSC 106 may be in communication with EMAC 108. An EMAC, such as EMAC 108, may contain a computing device (e.g., a processor) and an associated memory. The associated memory may comprise an article of manufacture including a computer-readable medium having instructions stored thereon that, if executed by a computing device (e.g., a processor), cause the computing device to perform various methods. The associated memory may contain executable code for converting braking commands into a motor current command.

An EMAC, such as electromechanical actuator controller 108, may provide a drive signal to one or more electromechanical actuators (e.g., electromechanical actuator 110, also referred to as "EA" 110) of an aircraft brake to drive an electromechanical actuator to a commanded position. Thus, electromechanical actuator 110 may apply braking force directly.

In various embodiments, EMAC 108 may communicate with EA 110 by sending a command signal to EA 110 via an I/O interface. The command signal may contain one or more commands and/or a drive signal/drive voltage. For example, a drive signal may command a certain amount of force to be applied by EA 110.

In various embodiments, feedback 116 may be generated by electromechanical actuator 110 and by electromechanical actuator controller 108.

A BITE system (also referred to herein as a BITE region) may be any system that allows any portion of a brake control system (e.g., EMAC) to be at least partially and reversibly disconnected from another aircraft system or component. With reference again to FIG. 1, BITE region 114 is shown with BITE components 112. A BITE system may allow for the severing and reestablishing of I/O channels or an I/O interface. A BITE system may comprise one or more switches, connectors, gateways, or other devices that allow for the selective, reversible severing of an I/O channel. For example, BITE components 112 allow for the selective, reversible severing of an I/O channel.

A BITE system may further comprise a testing module. A testing module may contain a computing device (e.g., a processor) and an associated memory. The associated memory may contain executable code for performing various actions, including the sending and receiving of test signals and the creation and execution of test scripts. The associated memory may comprise an article of manufacture including a computer-readable medium having instructions stored thereon that, if executed by a computing device (e.g., a processor), cause the computing device to perform various methods. In various embodiments, a brake system controller may comprise a testing module and, in such embodiments, the BITE system need not necessarily comprise a testing module.

In various embodiments, a testing module may be configured to send and receive test signals. A test signal may be any signal that encodes a command for an action performed for testing, calibration, optimizing, or other purposes that are not, at the time the testing signal is sent, needed for the immediate operation of an aircraft. In this regard, a test signal may command an aircraft component to perform a task. For example, a test signal may command an electromechanical actuator to actuate and/or may command a servo valve to perform a task. In various embodiments, two or more test signals may be arranged in a particular order to comprise a test script.

In various embodiments, a testing module may also be configured to receive feedback (also referred to herein as a feedback signal or output signal) from an aircraft component and/or brake system controller and/or EMAC. Feedback may be delivered electronically, for example. Feedback may comprise any information relating to an aircraft component, such as its history, current status, or intended future status. Feedback may be sent to a testing module or, with reference to FIG. 1, to BSC 106 or EMAC 108, for example, in response to a test signal.

Feedback may be used to calibrate, tune, optimize, or otherwise alter the performance of various aircraft components. For example, feedback may comprise the actual pressure applied at an actuator. Feedback may also be used to detect when a component may require maintenance or a corrective action such as a repair. Feedback may also comprise a signal that encodes a component failure.

A testing module or other BITE system component may receive feedback to determine the appropriateness of the feedback. Appropriateness, as used herein, includes determining if feedback is consistent with a set of predetermined, "expected" feedback values. As feedback may represent a real-world event, result or condition, it may be useful to determine if the feedback result comports with the expected event, result or condition. Feedback that does not comport with the expected event, result or condition may be labeled as a failure, while feedback that does comport with the expected event, result or condition may be labeled as a pass.

For example, if a test signal commanded a braking pressure of, for example, 100 lbs/in$^2$ within a 3 lbs/in$^2$ tolerance and a feedback signal indicated that only 50 lbs/in$^2$ was actually applied, the testing module or other BITE system component may determine that the feedback is inconsistent with the "expected" value of the feedback. The testing module or other BITE system component may then report this inconsistency (i.e., failure) to other aircraft components, such as a cockpit component. Alternatively, using the same situation, if a feedback signal returned a value of 99 lbs/in$^2$, then the testing module or other BITE system component may determine that the feedback was appropriate and may record this in a log.

In various embodiments, a testing module or EMAC 108 may send a test signal to an aircraft component (e.g., an actuator), the aircraft component may take an action based upon the test signal, and feedback may be sent to the testing module or EMAC or BSC for analysis.

For example, a testing module or EMAC 108 may send a test signal to drive EA 110 to a commanded position. Data collected during testing may include phase lag (lag from command to response), step response (e.g., 0% commanded to x % commanded), and final position. These data may be used to determine the functional status of EA 110. For example, the final position may be recorded and performance may be compared to one or more of the following: 1) known test cases (i.e., experimentally derived data), 2) predicted envelopes based on envelopes of operation, 3) trends based on past performance, and 4) performance compared to "peer" electromechanical actuators within the same aircraft (i.e., other EAs).

In further embodiments, a testing module or BSC 106 or EMAC 108 may send a test signal simulating a sensor failure. For example, BSC 106 may receive a signal indicating a brake pressure of 1000 psi when there is no input command for braking, thus indicating an uncommanded braking failure. BSC 106, if functioning as designed, should identify the uncommanded braking failure and respond accordingly.

Figure 7:
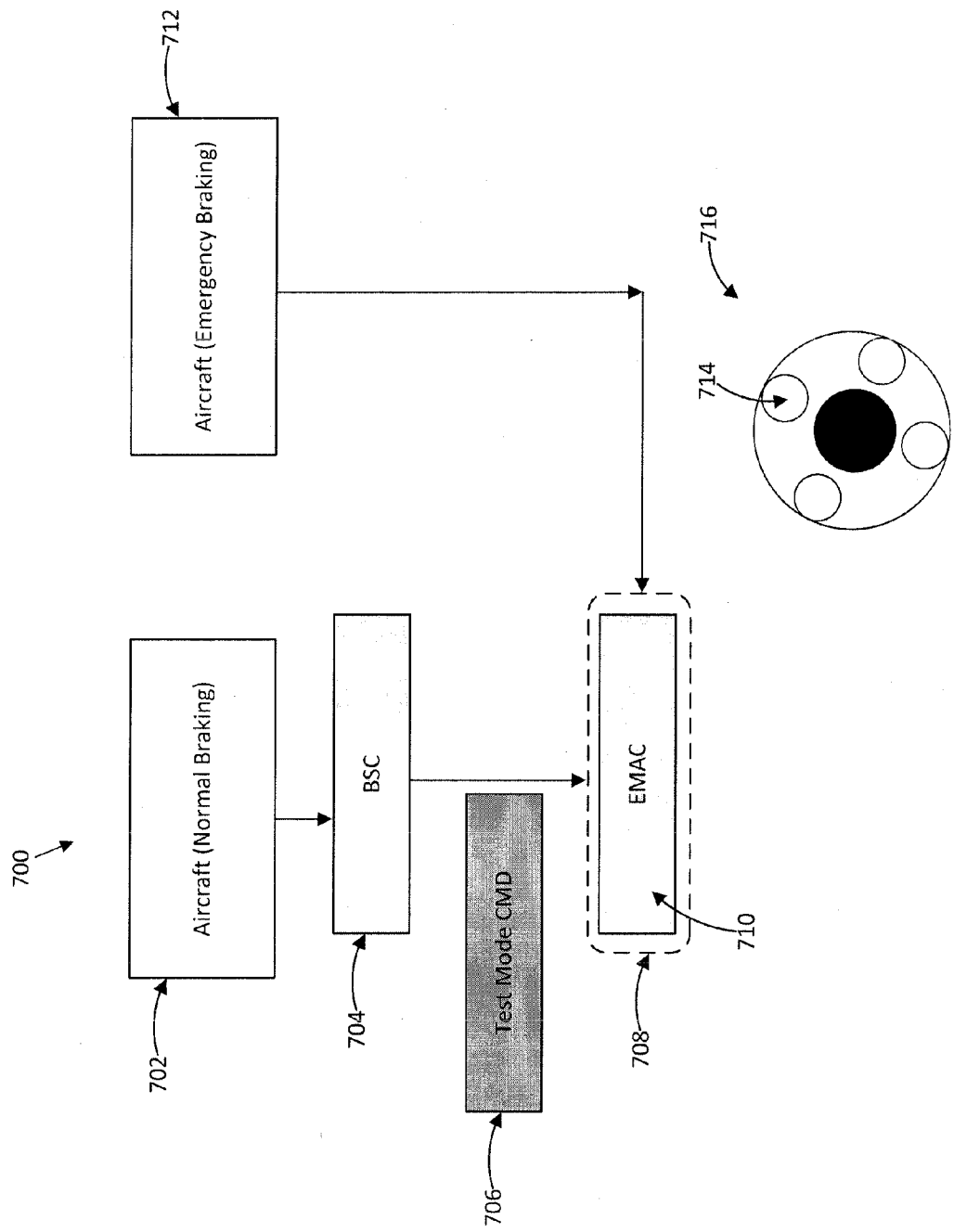
FIG. 7 illustrates a brake control system and a BITE region in accordance with various embodiments.

With reference to FIG. 7, aircraft braking control system 700 is illustrated. Brake input 702 may be received by BSC 704. BSC 704 may determine an appropriate braking response to the brake input 702 and forward such commands to EMAC 710. EMAC 710 may in turn provide a drive signal or other command signal to EA 714, which is one of several electromechanical actuators on electric brake 716. Testing module 706 may be in electrical communication with EMAC 710. Safety interlock 708 may be disposed around EMAC 710, allowing one or more I/O channels to EMAC 710 to be selectively severed and re-established. In that regard, I/O channels from BSC 704 to EMAC 710 may be selectively severed and re-established. During a test, safety interlock 708 may sever I/O channels from BSC 704 to EMAC 710 and testing module 706 may inject testing commands to EMAC 710. EMAC 710 may respond to those commands, for example, by sending a command signal and/or drive signal to EA 714.

Emergency brake system 712 may comprise any system configured to relay emergency braking commands. An emergency braking command may be any command that requests braking without regard to BITE status. In other words, an emergency braking command requests the cessation of testing and the application of braking force. Emergency brake system 712 may comprise one or more emergency brake input devices (e.g., pedal, handles, switches, button, etc). The emergency brake system 712 may also comprise an I/O channel that connects BSC 704 to EMAC 710 through a channel that is not able to be severed by safety interlock 708. Emergency brake system 712 may be in electrical communication with EMAC 710 in a manner that bypasses safety interlock 708.

In response to an emergency braking command from emergency brake system 712, EMAC 710 may cease testing that may be in progress and may issue a braking command to EA 714 in accordance with the emergency braking command.

In various embodiments, emergency brake system 712 may receive an indication from an aircraft component that is indicative of wheel touchdown upon landing. For example, a landing gear WOW ("weight-on-wheel") signal, landing gear downlock signal, TQA ("Throttle Quadrant Assembly") signal, throttle position signals, a signal indicating that wheel speed is accelerating at a rate consistent with touchdown, and the like may be sent by emergency brake system 712 to EMAC 710. In that regard, EMAC 710 may cease testing and safety interlock 708 may restore I/O channels.

Figure 2:
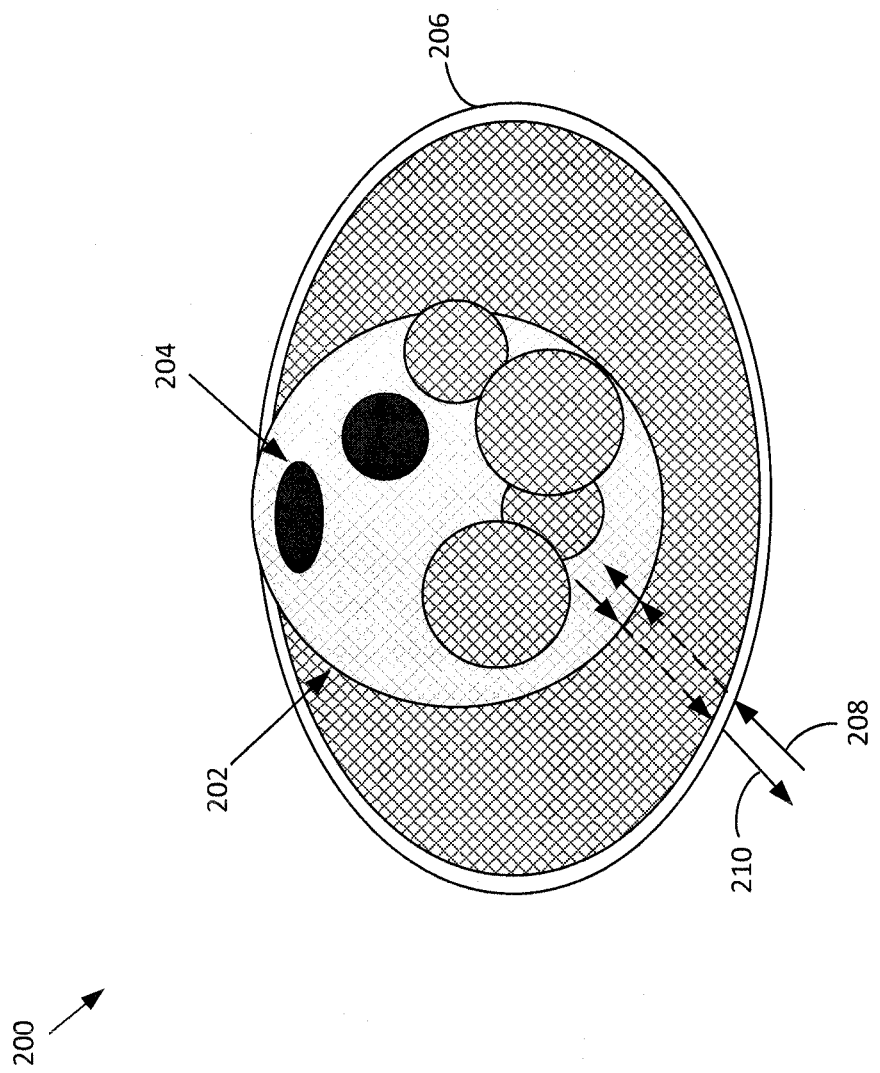
FIG. 2 illustrates an additional aspect of a brake control system and a BITE region in accordance with various embodiments.

Now referring to FIG. 2, BITE system 200 is illustrated. BITE region 206 is shown wrapping EMAC 202. I/O channels 208 and 210 are shown entering BITE region 206 and connecting to EMAC 202. BITE region 206 may reversibly sever I/O channels 210 and 208. While severed, BITE region 206 may (through, for example a testing module) send test signals through I/O channels 210 and 208 to EMAC 202.

In certain situations, for safety, it is desirable to ensure that testing may be interrupted by external factors (e.g., pilot input). For example, there may be situations where a pilot may need to unexpectedly command braking. If testing is in progress and such a situation arises, it is advantageous to have a system by which testing could be interrupted and the brake control system could return to pilot control. In various embodiments, safety interlock 204 allows EMAC 202 to communicate with other aircraft components. For example, safety interlock 204 may communicate directly with emergency aircraft signals, without intervention of BITE region 206. Thus, safety interlock 204 may comprise I/O channels between aircraft components that BITE region 206 may not sever, thus providing uninterruptible I/O channels. In such embodiments, safety interlock 204 may thus comprise I/O channels that are redundant with respect to the severable I/O channels of BITE region 206. In various embodiments, such redundancy enhances safety and ensures that signals, such as emergency signals, have an alternate pathway that bypasses BITE region 206. In various embodiments, BITE region 206 may detect the use of safety interlock 204 and thus determine that any testing may be ceased. Accordingly, BITE region 206 may reestablish one or more severed I/O channels responsive to the use of safety interlock 204.

In various embodiments, with reference to FIG. 1, BSC 106 and EMAC 108 may agree that present conditions are suitable to commence testing. For example, EMAC 108 may communicate with BSC 106 to determine if it is appropriate to begin testing. In addition, BSC 106 may command EMAC 108 to commence testing.

Safety interlock 204 may also detect signals from other aircraft components and detect patterns indicative of a scenario where testing may cease. For example, if a pilot depresses a brake pedal during flight and aircraft altitude is dropping, the safety interlock 204 may notify the BITE region 206 to reestablish I/O channels and cease testing.

In various embodiments, BITE region 206 may determine that one or more tests may be performed. For example, tests may be programmed to occur over varying time intervals. Testing may be performed using test scripts that arrange several testing procedures into a particular order.

Prior to conducting a test, BITE region 206 (through, for example, a testing module), may determine if an aircraft's current state will accept the request for the test of the aircraft's brake control system. For example, a BITE system may determine if the aircraft is parked, taxiing, taking off, flying, landing, or on approach for landing. In certain instances, the BITE system may determine that testing should not occur.

If it is appropriate to run a test, BITE region 206 may then reversibly sever one or more I/O channels (e.g., I/O channels 210 and 208) to prepare for testing. Testing may comprise generating and sending test signals. For example, test signals may comprise signals encoding commands typically associated with parking, taxiing, taking off, flying, landing, or on approaching for landing. In various embodiments, test signals may also encode various data related to aircraft status. For example, test signals may comprise wheel speed signals, landing gear WOW signals, landing gear downlock signals, TQA signals, throttle position signals, and the like.

In various embodiments, a testing may occur when the aircraft is parked. In that regard, one or more EAs on a wheel may be commanded to apply pressure sufficient to keep the aircraft parked, while the remaining EAs undergo testing. Upon completion of the testing, the one or more EAs that underwent testing may be commanded to apply pressure sufficient to keep the aircraft parked and the one or more EAs that had been applying parking pressure may undergo testing. Testing may continue in this "round robin" format until all EAs on a wheel have been tested. In that regard, parking functionality is maintained while testing occurs.

Moreover, for aircraft with multiple wheel bogie gears, the "round robin" can be performed on a brake-by-brake scheme (a "round robin" of brakes). For example, on a 4-wheel bogie gear with brakes 1-4, brake 1 may be tested while brakes 2-4 are increased in pressure to assure the aircraft does not move. Then, brake 2 may be tested while pressure is increased at brakes 1, 3 and 4 to maintain the aircraft in park. Testing may proceed until all brakes are tested.

In various embodiments, and as described herein, BITE region 206 may then receive feedback. Feedback may be used to compare and evaluate actual system responses to expected responses. BITE region 206 may then record, communicate and/or summarize the results of the test.

Figure 3:
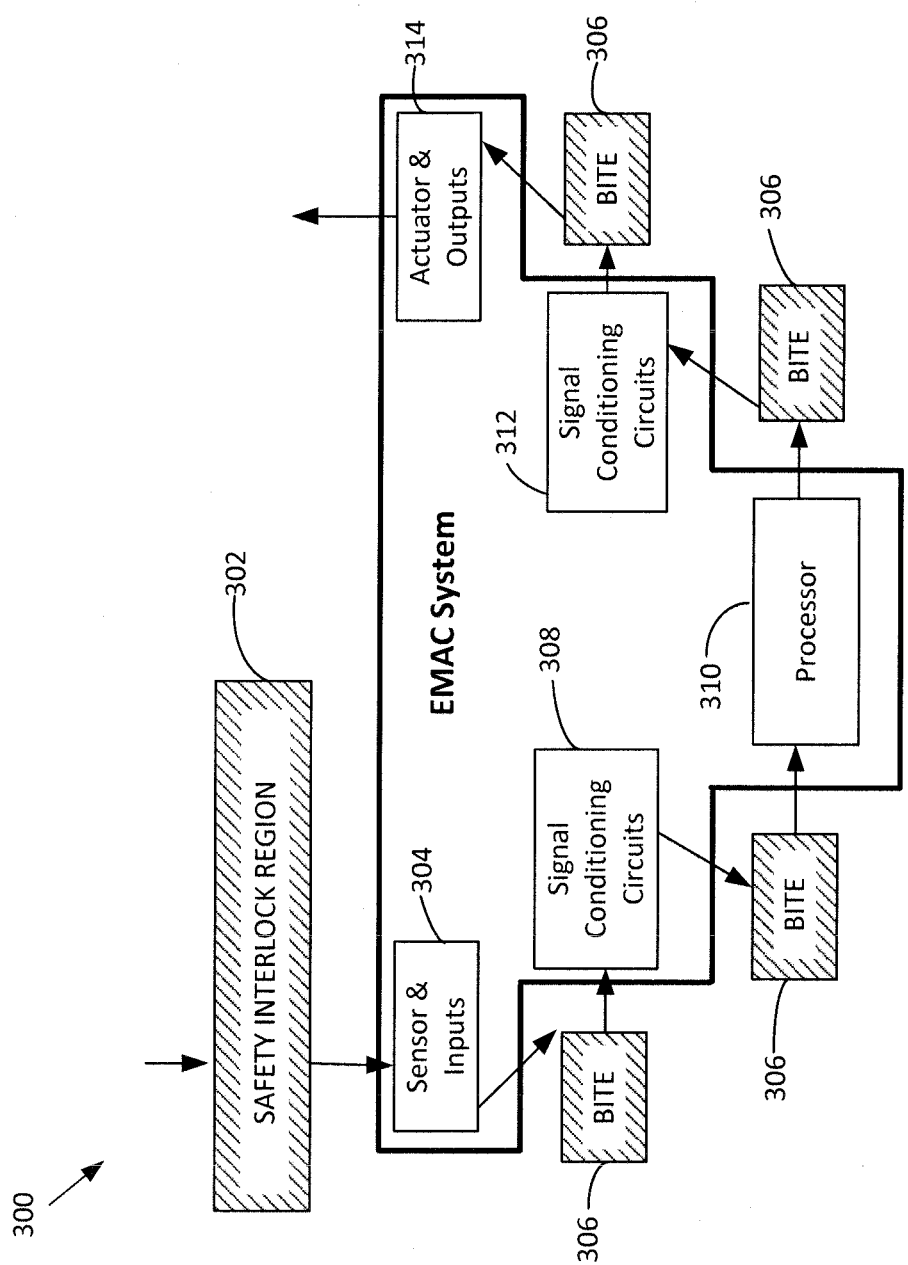
FIG. 3 illustrates a more detailed view of a brake control system and a BITE region in accordance with various embodiments.

With reference to FIG. 3, brake control system 300 is shown. The brake control system comprises an EMAC 110, labeled as processor 310. The brake control system also comprises sensor and inputs 304 and signal conditioning circuits 308, each of which is in electrical communication with BITE system 306. The brake control system further comprises signal conditioning circuits 312 and actuator outputs 314, each of which is in electrical communication with BITE system 306. Safety interlock 302 is in electrical communication with sensor and inputs 304 and, as shown, this connection is not made via BITE 306.

As shown in FIG. 3, BITE system 306 is in communication with various brake control system components (e.g., signal conditioning circuits 308) and may, accordingly, selectively sever or reestablish I/O channels of a brake control system. The BITE system may selectively sever or reestablish I/O channels directly to or from an EMAC, as shown in the interaction between BITE 306 and EMAC 310, or the BITE system may selectively sever or reestablish I/O channels of other brake control system components, as shown in the interaction between BITE 306 and sensor and inputs 304. Also as shown, safety interlock 302 may bypass BITE 306 so that operation of BITE 306 may be modified should safety reasons so require.

For example, when it is determined that running a test is appropriate, a BITE system may sever I/O channels and a test script may be executed. The test script may comprise test signals that command taxi stops, so the brake control system would function as if the aircraft were in a taxi maneuver on a runway. The test script may then indicate that the throttles are moved forward for takeoff power and that the wheel speed has increased, simulating a takeoff. The test script may further comprise a test signal encoding a weight on wheels signal that reports that the wheels have left the ground, further simulating takeoff. Further, a test signal may indicate that the landing gear has been retracted. A test signal may indicate that the aircraft flaps have been lowered and that the throttles have been set to idle, indicating an imminent landing. In response, the brakes may be applied. The aircraft's responses to these events may be recorded and evaluated to determine abnormalities or other areas of concern.

Figure 4:
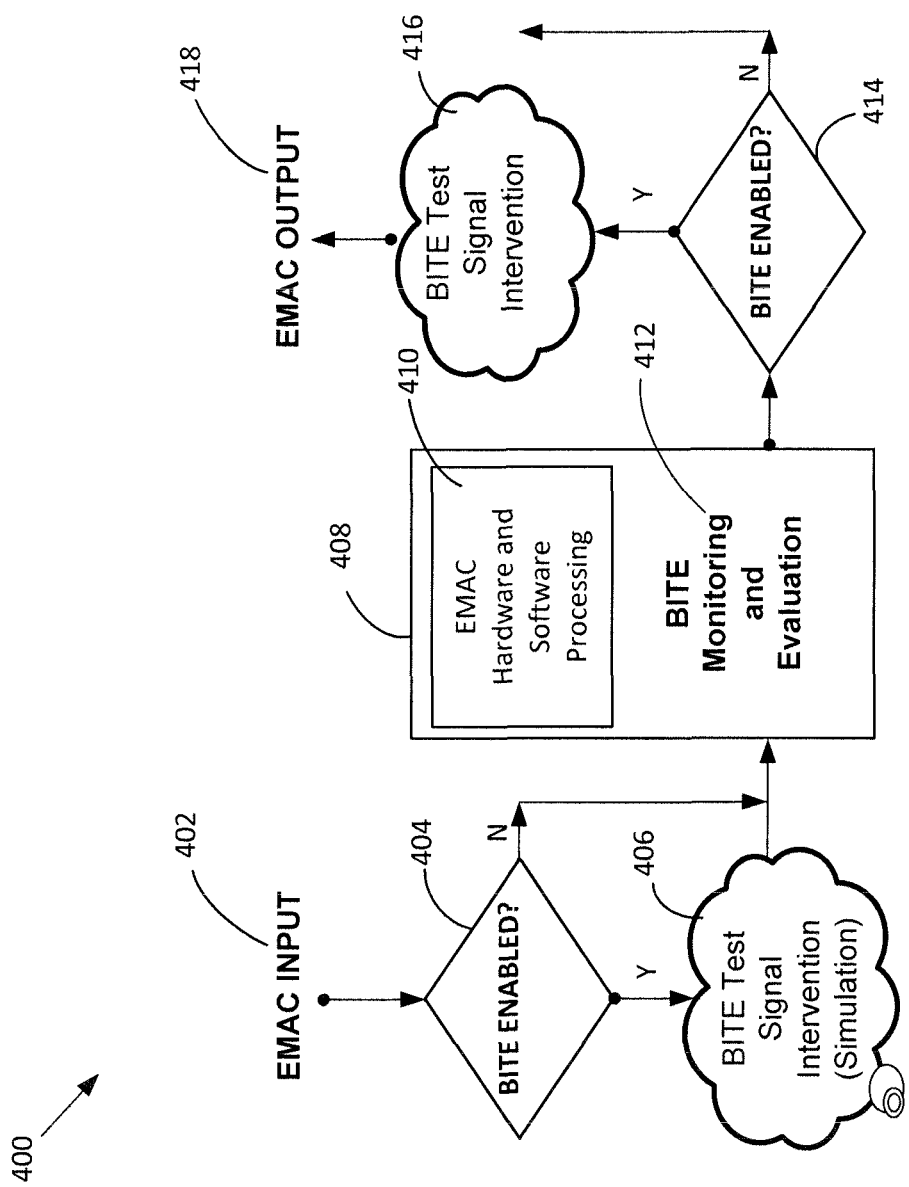
FIG. 4 illustrates a use scenario of a brake control system and a BITE region in accordance with various embodiments.

An example of BITE operation 400 is shown in FIG. 4. EMAC Input 402 is forwarded to BITE Enabled decision point 404. If BITE is enabled, it is understood that EMAC Input 402 is a simulation per BITE simulation point 406. Accordingly, in a simulation, EMAC Input 402 comprises a test signal. If BITE is not enabled, EMAC Input may proceed to the brake control system 408. Within brake control system 408, EMAC hardware and software 410 process the EMAC Input 402 and determine an appropriate response. BITE monitoring and evaluation 412 monitors EMAC hardware and software 410 and EMAC Input 402 when BITE is enabled.

EMAC hardware and software 410 may prepare a signal responsive to EMAC Input 402. Such a signal may be passed to BITE Enabled decision point 414. If BITE is not enabled, the signal may be forwarded to another aircraft component as EMAC output 418. If BITE is enabled, BITE may intervene at BITE Test Signal Intervention 416 to monitor and/or alter the output signal. The output of BITE Test Signal Intervention 416 is EMAC output 418.

Figure 5:
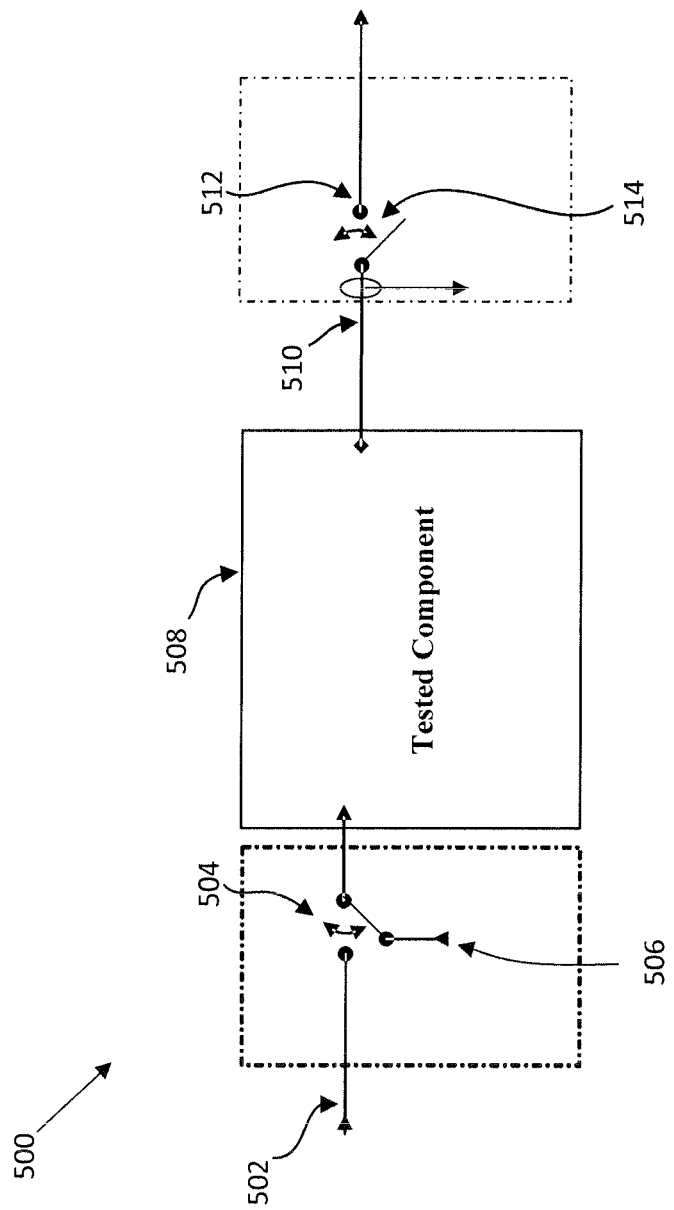
FIG. 5 illustrates use of a brake control system and a BITE region in accordance with various embodiments.

With reference to FIG. 5, BITE operation example 500 is shown. I/O channel 502 exists between an aircraft component and tested component 508. I/O channel 512 exists between tested component 508 and an aircraft component, which may or may not be the same aircraft component involved with I/O channel 502. I/O channel 502 may be selectively severed at point 504 while I/O channel 512 may be selectively severed at point 514. Points 504 and 514 may provide access to a BITE region (not shown) comprising one or more BITE components. As described above, various BITE components may generate test signals, receive feedback signals, and evaluate feedback signals.

During testing, I/O channel 502 may be selectively severed at point 504. The BITE region may introduce test signal 506 at point 504. Test signal 506 is relayed to tested component 508. Tested component 508 may then respond to test signal 506 and produce feedback signal 510. Feedback signal 510 may be routed to the BITE region at point 514. The BITE region may then record feedback signal 510 and evaluate it accordingly.

Figure 6:
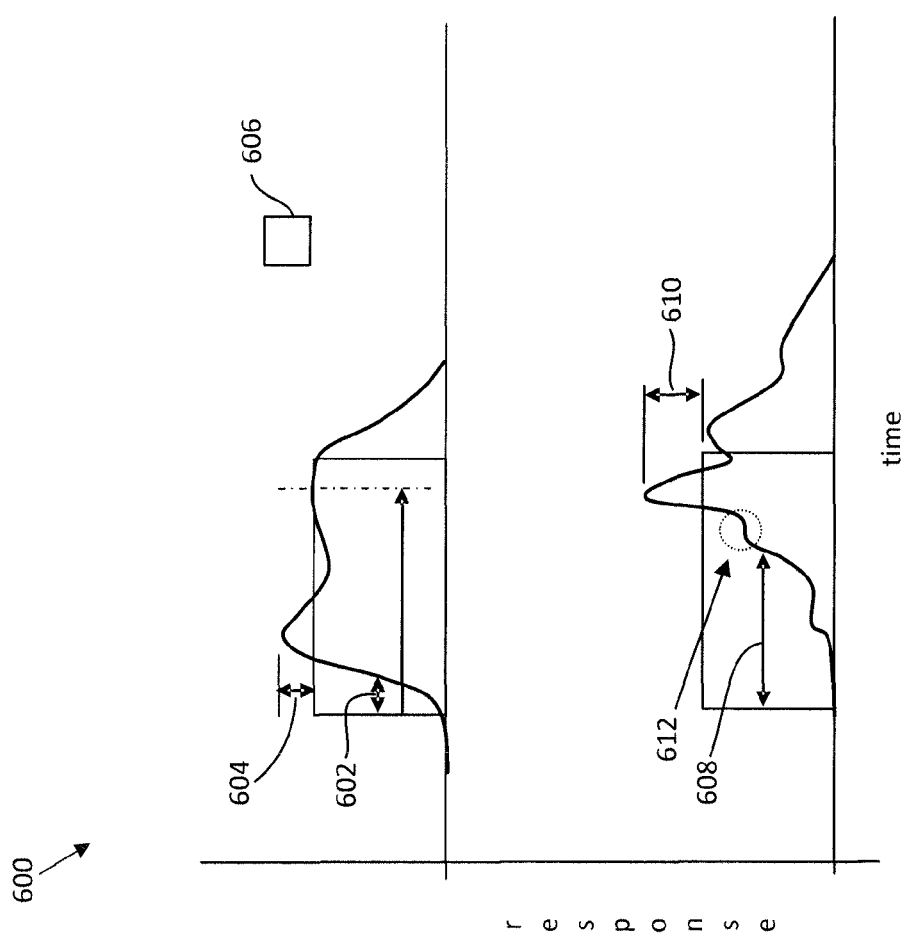
FIG. 6 illustrates a properly functioning ram position response in the top graph and a malfunctioning valve response in the bottom graph in accordance with various embodiments.

Evaluation of feedback signals may be performed in any suitable manner, as elsewhere described herein. For example, FIG. 6 depicts test evaluation 600. Test evaluation 600 comprises a comparison of a properly functioning ram position response (top graph) and a malfunctioning ram position response (bottom graph). One or more properly functioning ram position response profiles may be stored in a BITE region's memory for comparisons to future testing. The stored properly functioning ram position response profiles may be derived from experimental data or may comprise previous "known good" results of the same tested electromechanical actuator. In FIG. 6, an EMAC may command an EA to move a ram to a predetermined position. The movement of the ram may be considered the response.

With continued reference to the top graph of FIG. 6, a properly functioning ram position response is shown. Time is shown on the x axis while response is shown on the y axis. Response may be determined by feedback signals. The command box 606 illustrates the commanded time and commanded position. For demonstration purposes, response is depicted as a generic indicator for the action of a tested component, although, in various embodiments, response could represent, for example, applied brake force.

Lag 602 illustrates the lag time between test signal transmission and the beginning of a response. Overshoot 604 illustrates the difference between the commanded response and the response produced. In various embodiments, an overshoot and/or a lag within a certain range is considered acceptable.

With reference now to the bottom graph of FIG. 6, a malfunctioning ram position response is shown. Time is again shown on the x axis while response is again shown on the y axis.

Lag 608 illustrates the lag time between test signal transmission and the beginning of a response. As shown, lag 608 is larger than lag 602, which may indicate a problem with the tested component. Overshoot 610 illustrates the difference between the commanded response and the response produced. As shown, overshoot 610 is greater than overshoot 604. The BITE region may then determine that a malfunction is occurring. Point 612 illustrates an aberration in the response. In a test of an electromechanical actuator, such an aberration may indicate a mechanical issue involving the electromechanical actuator. The BITE region may use this information to determine that a malfunction is occurring and, moreover, to identify the type of malfunctioning occurring.

More specifically, there are a number of tests contemplated herein. For example, force, position and motor current may be manipulated for testing purposes. The velocity and acceleration in both linear and angular modes may be measured in testing. For example, an EMAC may be commanded to send drive power to an EA. The output of the EMA (i.e., the volt/current waveform) may be observed and compared to a standard or expected test result.

In additional testing modes, an EA's deadband (i.e., time to get started), rise time to a position, force or motor current, etc. can be analyzed to assure proper functioning. Tests may occur in closed loop control or open loop control.

Test command inputs may include EMAC-to-EMAC communications (i.e., commands and responses) may be tested, as well as EA to EMAC communications (commands and responses). System voltage, system current, motor voltage, motor current, position: angular and linear (angular on the motor or linear from a different EMA linear sensor), velocity (angular and linear), acceleration (angular and linear), EMA force. Test command outputs may include EMAC commands and responses, motor drive voltage, motor drive current, motor angular position, velocity, and acceleration.

As described above, the use of a safety interlock surrounding an EMAC may provide improved efficiencies in testing while maintaining emergency braking functionality. In various embodiments, a BSC and an EMAC may be integrated as a single unit. In such configurations, a safety interlock may be disposed around the integrated BSC/EMAC.

Figure 8:
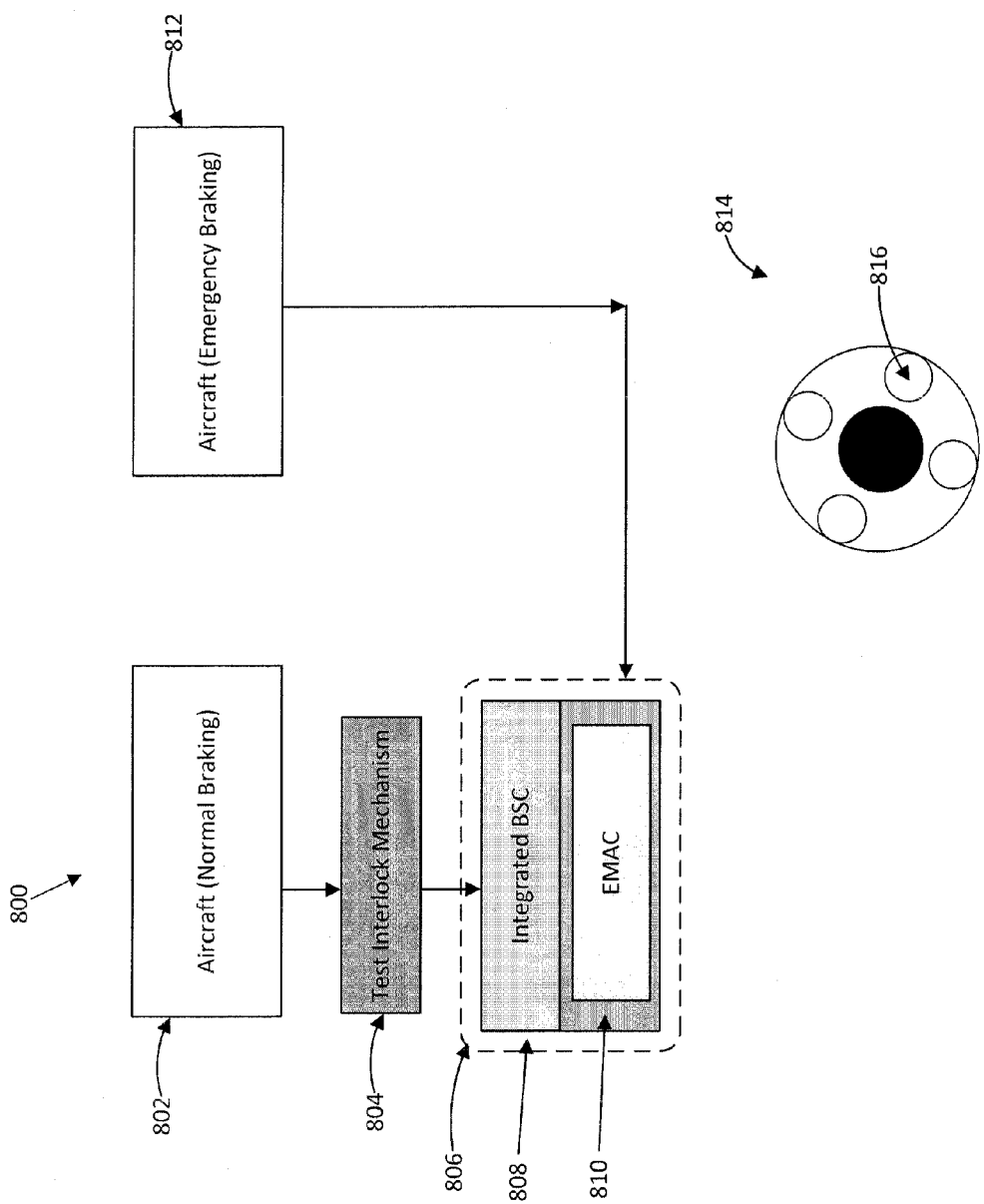
FIG. 8 illustrates a brake control system and a BITE region in accordance with various embodiments having an integrated brake system controller ("BSC") and EMAC.

With reference to FIG. 8, brake system 800 is illustrated. Brake input 802 may be received by integrated BSC 808 and EMAC 810. Though integrated, functionally integrated BSC 808 and EMAC 810 is illustrated as BSC 808 and EMAC 810, even though both BSC 808 and EMAC 810 are configured as an integrated unit. BSC 808 may determine an appropriate braking response to the brake input 802 and forward such commands to EMAC 810. EMAC 810 may in turn provide a drive signal or other command signal to EA 816, which is one of several electromechanical actuators on electric brake 814. Testing module 804 may be in electrical communication with EMAC 810. Safety interlock 806 may be disposed around integrated BSC 808 and EMAC 810, allowing one or more I/O channels to integrated BSC 808 and EMAC 810 to be selectively severed and re-established. In that regard, I/O channels from brake input 802 may be selectively severed and re-established. During a test, safety interlock 806 may sever I/O channels from brake input 802 to integrated BSC 808 and EMAC 810 and testing module 804 may inject testing commands to integrated BSC 808 and EMAC 810. Integrated BSC 808 and EMAC 810 may respond to those commands, for example, by sending a command signal and/or drive signal to EA 816.

Emergency brake system 812 may comprise any system configured to relay emergency braking commands. Emergency brake system 812 may be in electrical communication with EMAC 810 in a manner that bypasses safety interlock 806.

In response to an emergency braking command from emergency brake system 812, EMAC 810 may cease testing that may be in progress and may issue a braking command to EA 816 in accordance with the emergency braking command.

In various embodiments, emergency brake system 812 may receive an indication from an aircraft component that is indicative of wheel touchdown upon landing. For example, a WOW signal or a signal indicating that wheel speed is accelerating at a rate consistent with touchdown may be sent by emergency brake system 812 to EMAC 810. In that regard, EMAC 810 may cease testing and safety interlock 806 may restore I/O channels.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of embodiments encompassed by this disclosure. The scope of the claimed matter in the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for testing an electric brake system, the method comprising:
    establishing a safety interlock between an electromechanical actuator controller "EMAC" and an aircraft component;
    severing an I/O channel between the EMAC and the aircraft component;
    sending at least one test signal to the EMAC;
    receiving, from the EMAC, a feedback signal to the test signal; and
    determining an appropriateness of the feedback signal; and
    wherein in response to an emergency braking command from an emergency braking system, the EMAC ceases testing and issues a braking command in accordance with the emergency braking command independently of a command from a brake system controller (BSC) coupled to the EMAC.

2. The method of claim 1, further comprising reestablishing the I/O channel.

3. The method of claim 1, wherein the feedback signal relates to a least one of an electromechanical actuator and a servo.

4. The method of claim 1, wherein the test signal commands an electromechanical actuator to actuate.

5. The method of claim 1, further comprising generating a test script comprising a plurality of test signals with a testing module.

6. The method of claim 1, further comprising establishing a non-severable I/O channel between the EMAC and the emergency braking system.

* * * * *